Patented Feb. 9, 1926.

1,572,568

UNITED STATES PATENT OFFICE.

LOREN B. SMITH AND EDWARD AVERY RICHMOND, OF RIVERTON, AND PETER A. VAN DER MEULEN, OF NEW BRUNSWICK, NEW JERSEY, ASSIGNORS, BY MESNE ASSIGNMENTS, TO THE PEOPLE OF THE UNITED STATES.

ATTRACTANT FOR INSECTS, PARTICULARLY FOR THE JAPANESE BEETLE.

No Drawing.    Application filed August 12, 1925. Serial No. 49,844.

(GRANTED UNDER THE ACT OF MARCH 3, 1883; 22 STAT. L. 625.)

*To all whom it may concern:*

Be it known that we, LOREN B. SMITH, EDWARD AVERY RICHMOND, both of Riverton, New Jersey, and PETER A. VAN DER MEULEN, of New Brunswick, New Jersey, citizens of the United States of America, and employees of the Department of Agriculture of the United States of America, have invented a new and useful Attractant for Insects, Particularly for the Japanese Beetle, of which the following is a specification.

This application is made under the act of March 3, 1883, chapter 143 (22 Stat. 625) and the invention herein described and claimed may be used by the Government of the United States or any of its officers or employees in the prosecution of work for the Government, or by any other person of the United States, without payment to us of any royalty thereon.

It has long been recognized that insects are attracted to flowers or foliage by certain odoriferous constituents given off by the plants in minute quantities but yet sufficient to enable the odor to be noticed by the insects.

The discovery and invention which forms the subject of this application has to do with certain odoriferous constituents derived from plants or made synthetically, applied either singly or in certain combinations, to be described hereinafter, in such a manner as to attract insects and particularly Japanese beetles.

Our experiments have shown that many chemicals will either attract or occasionally repel insects but there are a few substances or combinations of substances which have a remarkably strong attracting effect. It is the purpose of this application to disclose particularly one such preparation and to describe several methods for its application and to cover this preparation and its combinations in this patent application.

We have found that the compound geraniol by itself and in various combinations produces an odor which is extremely attractant to the Japanese beetle. In fact we have been able to show that beetles which are feeding on foliage and fruits which they infest particularly heavily because of the particular liking which they have for it, will leave this foliage and fruit when an odor is imparted to other foliage in the vicinity by an application of a small amount of geraniol. The result has been that in certain instances an extremely high concentration of beetles has been drawn into a restricted area by this process, drawing them away from such foliage and fruit as that of ripening peaches or ripening apples. It is obvious that such a result has great value, in that the beetles can be largely removed from valuable fruit trees or other foliage, concentrated upon foliage which is of little or no economic value, and can there be destroyed by the application of contact poisons, stomach poisons, fumigation or other means which, even though they may injure the plants of little economic importance, will cause a very great destruction of beetles. It will be apparent from the example cited, that this mode of treatment greatly increases the effectiveness of existing methods of control.

As examples of specific methods for the application of geraniol we may cite the application directly as a liquid applied by means of an atomizer, as an emulsion in water produced in any one of a number of well known ways, such as emulsification by means of a soap, the geraniol being either as such or dissolved in a suitable substance not miscible with water. Again it may be applied upon a suitable solid carrier such as finely divided charcoal or kieselguhr. In this form the geraniol and carrier can be suspended in water and applied by the usual spray methods. It may also be incorporated in such a carrier as charcoal or kieselguhr or other substances of such a nature as will hold geraniol, and the preparation applied as a dust. It will be evident that with any of the methods cited there is produced upon the foliage a source of the substance geraniol from which it gradually evaporates into the air, the rate of evaporation being largely determined by the nature of the carrier and by its physical condition. For example, a coarsely ground carrier exposing less surface than a finely divided one will give off geraniol more slowly than the fine one. It is evident that geraniol in any of these combinations mentioned may be incorporated in insecticides, sprays or dusts.

In cases in which these spray methods produce too rap'd a volatilization of the geraniol, which may occur on a windy day, for example, the geraniol can be applied by hanging in a selected locality a container which holds the geraniol and which is arranged in such a manner as will produce a slow volatilization of the geraniol either by a small opening in the container or a suitable wick or other method which will be apparent to the average operator of spraying or dusting operations.

There is yet another method of application which we have found very effective. We have incorporated geraniol in substances which the insects will eat. For example bran mixed with molasses, such mixtures act as baits in drawing the insects to them. The baits may be either as mentioned or they may have added to them a poison such as arsenate of lead or Paris green. The baits may be placed in the open, thus drawing insects into restricted localities. A more satisfactory procedure consists in placing the poisoned or unpoisoned bait in a suitable trap so constructed as to permit the insects to enter the trap but not leave it. Field experiments have shown that a small trap will in the course of a day collect thousands of beetles from an infested orchard. It is evident that the geraniol may be introduced into these traps either as a liquid or incorporated in a suitable carrier.

It is not essential that the geraniol be in a pure form, when applied in any of these ways. There are many commercial products which contain geraniol as one constituent, and it is our purpose to include all such products in this application. As specific examples of such oils, which produce attraction, we have found that sassafras oil (Nat.), palmarosa oil, citronella oil, lemon-grass oil, geranium oils and rose oils, etc., are of value. It is understood that we do not limit ourselves to the particular oils mentioned, but include all products containing a sufficient amount of the essential constituent geraniol, to produce the desired result, namely, an attraction of the insects.

We claim:—

1. An insect attractant, comprising geraniol as the active ingredient.

2. An insecticide comprising geraniol and a poisonous constituent.

3. A composition of matter attractive to insects comprising geraniol on an absorbent carrier from which the geraniol is slowly volatilized.

LOREN B. SMITH.
EDWARD AVERY RICHMOND.
PETER A. van der MEULEN.